United States Patent [19]

Watkins et al.

[11] 4,344,413
[45] Aug. 17, 1982

[54] SOLAR HEATING PANEL FOR METAL BUILDINGS

[75] Inventors: Neil A. Watkins; Clayton H. Richardson, Jr., both of Starkville, Miss.

[73] Assignee: Gulf States Manufacturers, Inc., Starkville, Miss.

[21] Appl. No.: 142,219

[22] Filed: Apr. 21, 1980

[51] Int. Cl.³ .............................................. F24J 3/02
[52] U.S. Cl. .................................. 126/429; 126/431; 126/445; 126/449; 52/521; 52/527; 52/553
[58] Field of Search ........ 126/428, 429, 431, 443–445, 126/449, 450; 165/45, 485; 52/94, 96, 521, 527, 553, 173 R

[56] References Cited

U.S. PATENT DOCUMENTS

| | | | |
|---|---|---|---|
| 3,092,218 | 6/1963 | Clay | 52/795 |
| 3,236,011 | 2/1966 | Orr | 52/96 |
| 3,368,473 | 2/1968 | Sohda et al. | 52/799 |
| 4,020,989 | 5/1977 | Kautz | 52/795 |
| 4,184,476 | 1/1980 | McArthur | 126/431 |

FOREIGN PATENT DOCUMENTS 2755555  8/1978  Fed. Rep. of Germany ... 126/DIG. 2

*Primary Examiner*—Samuel Scott
*Assistant Examiner*—Lee E. Barrett
*Attorney, Agent, or Firm*—B. P. Fishburne, Jr.

[57] ABSTRACT

Entire or partial end wall or side wall sections of a corrugated metal building can be constructed economically with an integrated solar heating panel which can supply forty to sixty percent of winter heating during daylight hours. The solar heating panel or wall section matches and supplements the appearance of adjacent standard wall surfaces and a virtually unnoticeable transition from standard to solar heating wall surfaces is achieved. Heated air can flow by natural convection or with blower assistance through a plenum in the solar heating wall panel to and from connected ducting. A uniquely formed clip provides the proper stand-off spacing between superposed sheets which make up the solar heating panel and the clips also serve to securely join the several corrugated sheets in proper interfitting relationship with the use of strategically placed self-tapping screws and intervening closure strips which maintain solar plenum integrity.

3 Claims, 8 Drawing Figures

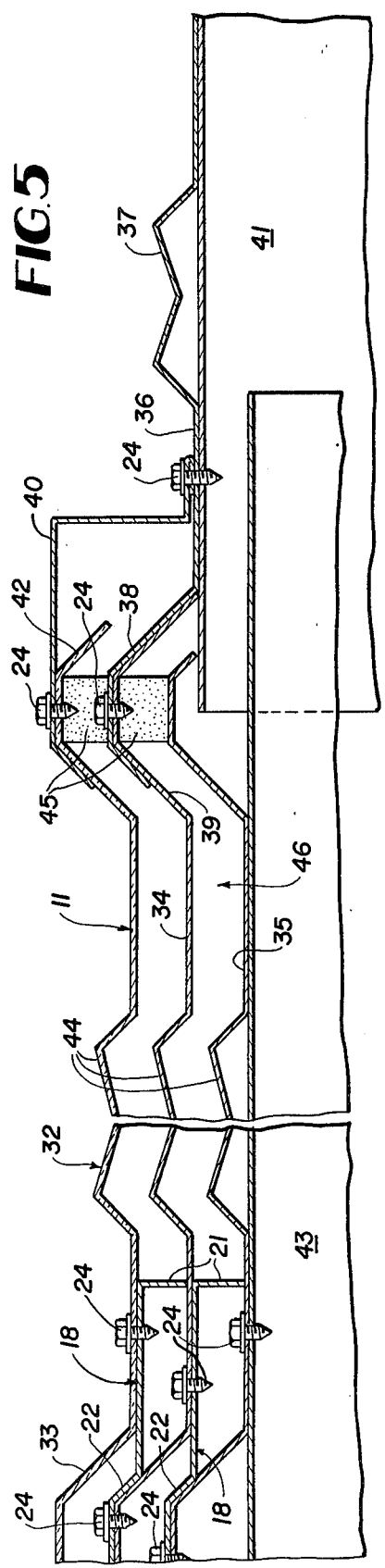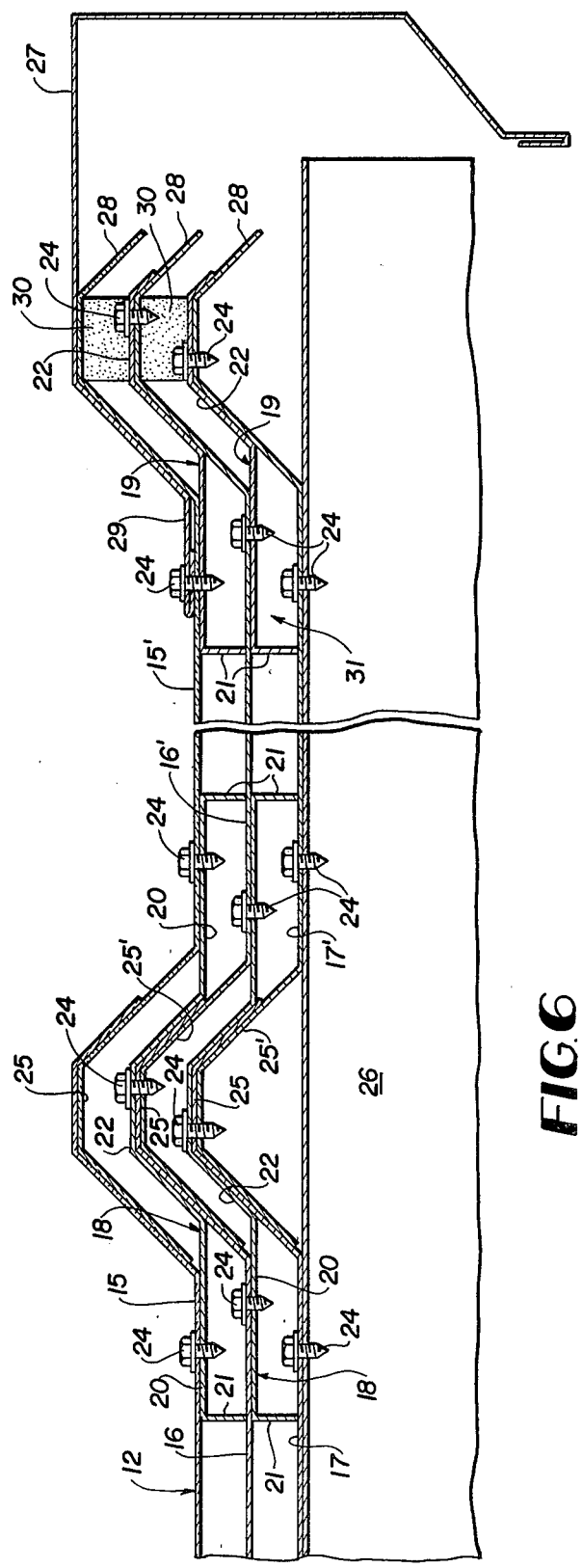

SOLAR HEATING PANEL FOR METAL BUILDINGS

BACKGROUND OF THE INVENTION

A wide variety of solar collectors are presently known in the prior art, some of which are designed as attachments to building structures or for inclusion in the roofs of buildings. A difficulty widely experienced by achitects, builders, and particularly the fabricators of metal buildings, is that known solar collector structures do not lend themselves to integration directly in the walls of buildings as presently constructed or fabricated. This incompatibility between solar collectors and conventional building wall structures has tended to make it impractical to include solar heating panels as a part of building walls, and therefore has significantly retarded the advancement of solar heating in various forms of building structures, and particularly in corrugated metal buildings.

Accordingly, a main object of the invention is to alleviate completely the above prior art difficulty by providing a solar heating collector or panel whose construction is simple and sturdy and fully compatible with the standard wall construction of corrugated metal buildings. By virtue of the invention, it is feasible to include in such buildings large solar heating wall panels while maintaining the full structural security of the walls and a fully acceptable appearance, all without any significant increase in construction costs. The self-contained solar heating wall panel is free of unsightly projections and has substantially concealed internal clips which are key elements in the panel assembly contributing to its full practicality.

Through the invention, entire building walls or large sections thereof may include solar heating panels which are able to supply up to sixty percent of the heating needs of a building in daylight hours. The heating panels can utilize natural convection of air through their plenums or a forced draft arrangement may be employed where desired. The construction of the solar heating wall panel in addition to being simplified and very sturdy is also compatible with ducting and air flow chambers found in conventional metal fabricated buildings.

A very unique aspect of the invention is the provision in the solar heating panel of clips which serve the dual purpose of providing the necessary uniform stand-off space between the adjacent corrugated panel sections and the mechanical connections at overlapping corrugations of the solar panel as well as the attachment of panel sections to rigid members or girts of the building.

Other features and advantages of the invention will become apparent during the course of the following detailed description.

BRIEF DESCRIPTION OF THE DRAWINGS

FIG. 5 is an enlarged fragmentary horizontal section taken on line 5—5 of FIG. 1.

FIG. 6 is a similar section taken on line 6—6 of FIG. 1.

DETAILED DESCRIPTION

Figure 1:
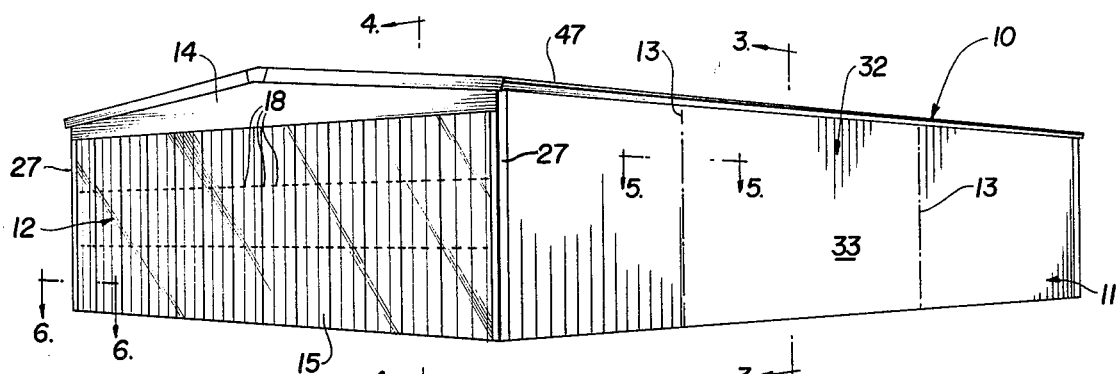
FIG. 1 is a perspective view of a corrugated metal building equipped with a solar heating wall panel in accordance with the present invention.

Referring to the drawings in detail wherein like numerals designate like parts, there is shown in FIG. 1 a typical corrugated metal building 10 having side and end walls 11 and 12. The solar heating wall panel, to be described in full detail, forming the main subject matter of the invention, can be directly incorporated in the building 10 as a large section of its side wall 11 extending from roof-to-floor as indicated by the phantom lines 13 in FIG. 1. Alternatively, the solar heating panel may be embodied in the entire building end wall 12 as illustrated in FIG. 1 except for a gable panel 14 immediately below the roof of the building, or in a large section of the end wall as heating needs dictate. In any case, the solar panel can be incorporated in the building wall with little or no effect on the erection cost of the building and without adverse effect on the appearance of the building. In fact, the solar panel can be color toned to compliment the chosen color of the building.

Figure 4:
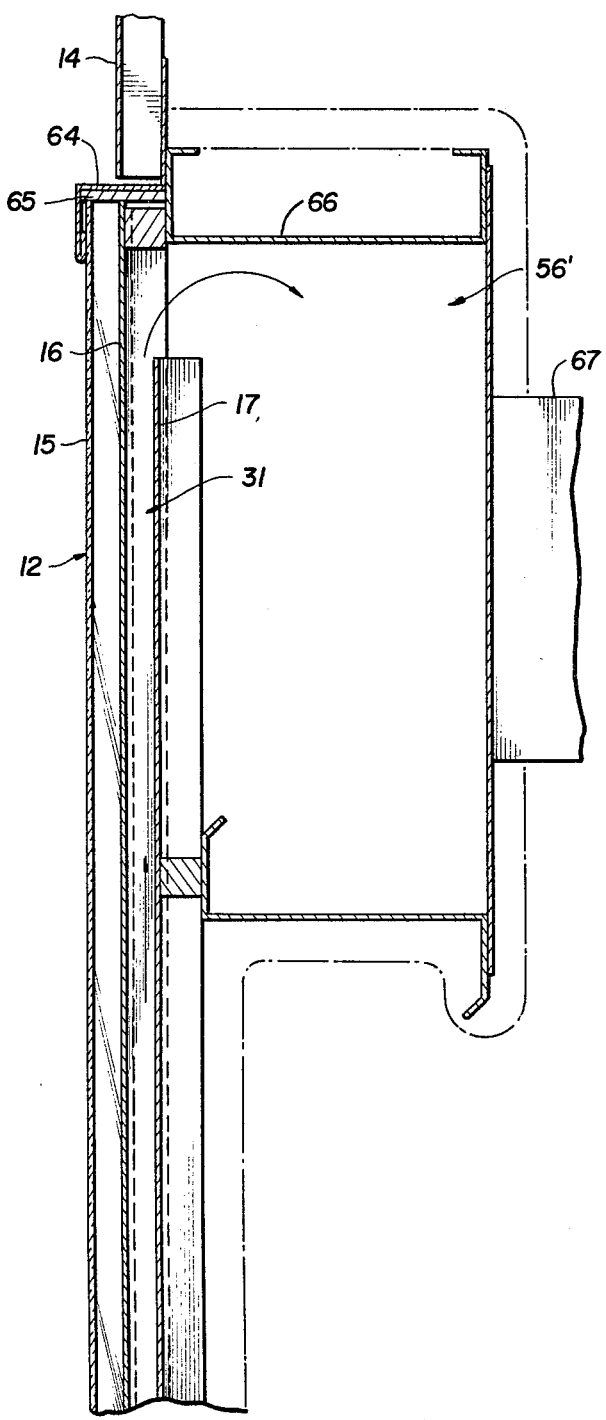
FIG. 4 is a similar view taken on line 4—4 of FIGS. 1 and 2.

Referring to FIGS. 4 and 6 which depict constructional details of the solar heating panel embodied in the building end wall 12, such heating panel comprises an exterior translucent corrugated sheet 15 formed of a tough, fire-resistant polyester resin and glass fiber composition. Such a product is manufactured and sold by Lasco Industries under the name LASCOLITE. Spaced inwardly of the translucent sheet 15 in parallel relation thereto is a dead black heat absorbing sheet 16, and inwardly of the intermediate sheet 16 is a galvanized metal sheet 17 similar to the corrugated metal sheeting forming the standard exterior of the building walls 11 and 12.

Figures 7, 8:
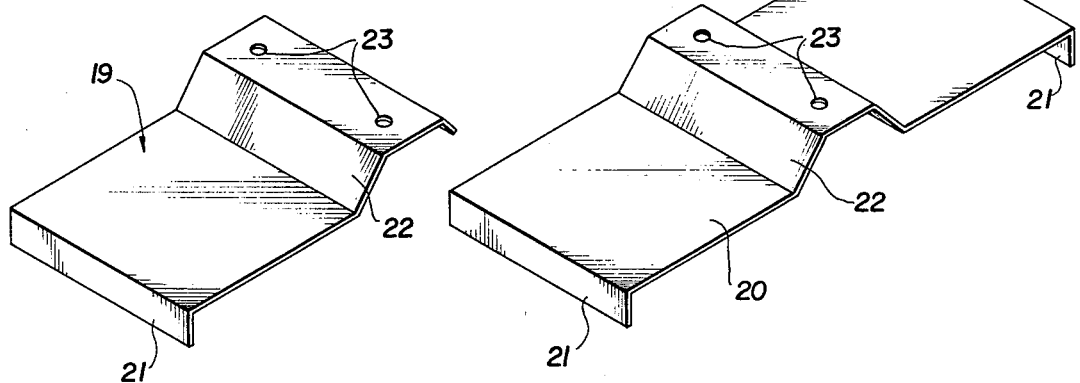
FIG. 7 is a perspective view of a panel clip.
FIG. 8 is a similar view of a half-clip.

Key elements of the invention comprise panel clips 18, and half-clips 19, shown individually in FIGS. 7 and 8. The utilization of the clips 18 and 19 is best shown in FIG. 6 for maintaining the proper stand-off spacing between the sheets 15, 16 and 17 and for interconnecting them in assembled relationship in the solar panel making up the end wall 12 of the building.

Each clip 18 has a flat plate rectangular body portion 20 carrying parallel right angular end flanges 21 of equal lengths. Midway between the end flanges 21, each clip has a truncated V-corrugation 22 containing two spaced apertures 23 for threaded self-tapping screws 24. Each half-clip 19 is identically formed except for the fact that one-half of the body portion 20 and the flange 21 carried thereby is eliminated at one side of the corrugation 22.

As shown in FIG. 6, two of the clips 18 are intervened with the three sheets 15, 16 and 17 at each corrugation 25 thereof. The corrugations 25 of the sheets 16 and 17 interfit snugly with the clip corrugations 22 and are firmly secured in assembled relationship by a plurality of the aforementioned self-tapping screws 24 in spaced relationship over the full height of the building wall. It will be noted in FIG. 6 that the same screws 24 which secure the clip corrugations 22 to the corrugations 25 of adjacent sheets 16 and 17 also serve to secure the like corrugations 25' of the next adjacent sheets 16' and 17' to the clip corrugations 22. The screws 24 thus hold clip corrugations 22 in firm clamped relationship with the interfitting sheet corrugations 25 and 25' and thus firmly connect the overlapping parts of the solar panel sheets 16, 16', etc. which make up the unitized solar panel spanning the entire building end wall 12. It will be understood that as many sets of clips 18 and connecting screws 24 will be employed as is necessary to connect the number of overlapping sheets 16, 16', etc. required, depending upon the total width of the building end wall 12.

Continuing to refer to FIG. 6, additional self-tapping screws 24 are employed to anchor the flat portions of the sheets 15, 16 and 17 on opposite sides of their corrugations to the flat body portions 20 of clips 18. It can be seen that two clips 18 are locked to the exterior and intermediate sheets 15 and 16, and the clips 18 at their corrugations 22 are locked to the sheets 16—16' and 17—17'. The clip end flanges 21 form stand-off spacer legs in the panel assembly to maintain the proper uniform spacing between the three sheets 15, 16 and 17 of the solar panel. The arrangement is very secure because the clips 18 and screws 24 are present at every corrugated zone across the full width of the end wall 12. Also shown in FIG. 6 are additional screws 24 which attach the interior galvanized corrugated sheet sections 17, 17', etc. to an existing girt 26 of the building structure.

At the corners of the building 10 adjacent to the end wall 12, corner flashings 27 are provided. The aforementioned half-clips 19 are utilized at these corner locations as shown in FIG. 6. Like the full clips 18, the half-clips 19 are placed between the panel sheets 15' and 16' and 17' with their flanges 21 forming rigid spacers. Corrugated terminals 28 of sheets 15', 16' and 17' interfit with the half-clip corrugations 22 and with a matching terminal 29 of corner flashing 27. Additional self-tapping screws 24 anchor the flashing terminal 29 to the outer sheet 15 and anchor the latter to the outer half-clip 19 of the pair of half-clips. Similarly, screws 24 attach or anchor sheets 16' and 17' to the inner half-clip 19 and girt 26, respectively.

In order to close or seal the ends of the spaces between the three sheets 15', 16' and 17', closure strips 30 of compressible material are placed between the adjacent corrugations 22 and 28 at the ends of the solar heating panel, as shown. A solar plenum 31 is formed in the panel structure between the intermediate black sheet 16—16' and the interior galvanized sheet 17—17'.

FIG. 5 depicts the construction of a solar heating panel 32 in any chosen large section of building side wall 11 as indicated by the phantom lines 13. The arrangement is similar to that shown in FIG. 6 pertaining to the end wall solar panel. An outer translucent sheet 33 similar to the described sheet 15, a spaced parallel intermediate dead black sheet 34, and an interior galvanized sheet 35 make up the solar panel 32 which extends from floor-to-roof in the side wall 11. A pair of the previously-described clips 18 separates the three sheets 33, 34 and 35 and maintains them properly spaced by the action of the flanges 21. These clips recur across the full width of the side wall panel 32 at each truncated V-corrugation of the three sheets and the clip 18. The self-tapping screws 24 are employed in the manner previously described in the side wall solar panel. The half-clips 19 are not used in the side wall solar panel.

Continuing to refer to FIG. 5, the standard exterior metal side wall building panel or sheet indicated at 36 having spaced recurring W-corrugations 37 extending from top-to-bottom thereof includes an end truncated V-corrugation 38 interfitting with a like corrugation 39 of the solar black intermediate sheet 34. A transition flashing 40 is provided at the juncture between the standard building panel 36 and the side wall solar panel 32. This flashing is anchored by additional self-tapping screws 24 to the standard panel 36 and the outer face of a building girt 41. The transition flashing 40 is further attached by other screws 24 to an end or terminal corrugation 42 of the outer translucent sheet 33. Still further screws 24 serve to attach the interfitting corrugations 38 and 39 and screws 24 attach flat portions of the inner galvanized sheet 35 to the outer face of a girt 43.

It may be noted in FIG. 5 that between the truncated V-corrugations of the sheets 33, 34 and 35 and the like corrugations 22 of the clips 18, the three sheets have aligned, recurring W-corrugations 44 to match the configuration of the standard building wall panels which contain alternating truncated V and W corrugations. The same arrangement is present in the end wall 12 and in the end wall solar panel depicted in FIG. 6, although in that figure the W-corrugations are broken away and do not appear.

As described in connection with FIG. 6, the ends of the spaces between the three sheets 33, 34 and 35 are closed by compressible strips 45. A solar plenum 46 is formed between the black intermediate sheet 34 and the interior galvanized sheet 35.

Figure 3:
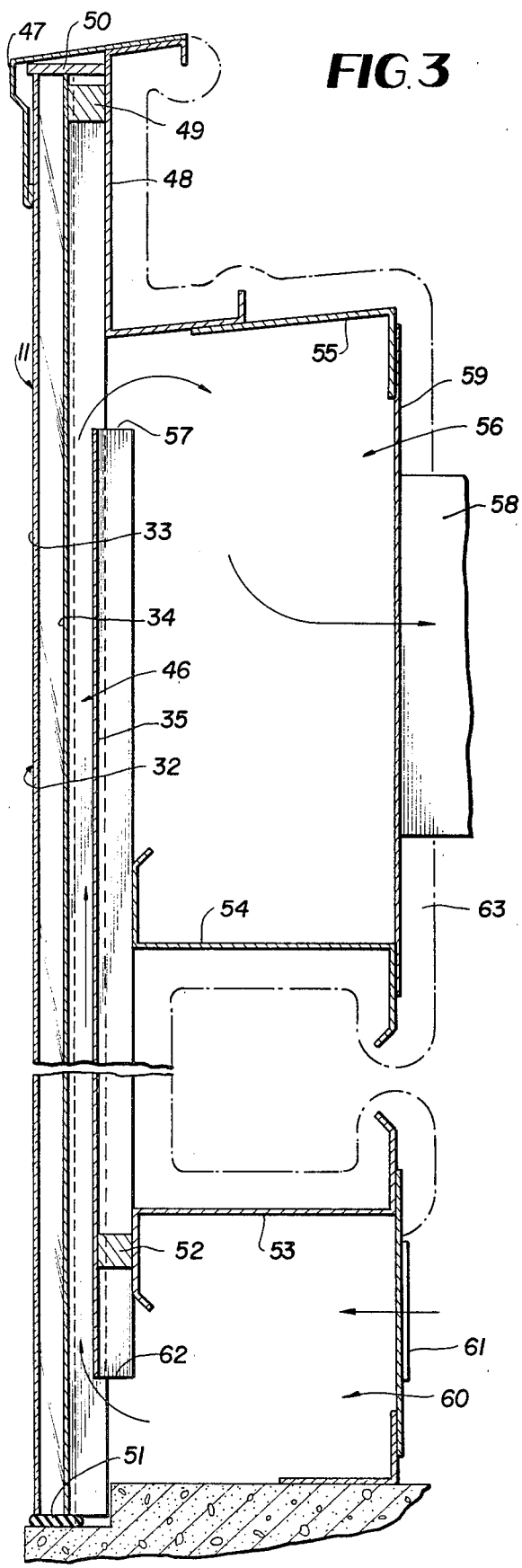
FIG. 3 is an enlarged fragmentary vertical section through a building side wall solar heating panel taken on line 3—3 of FIG. 1.

As shown in FIG. 3, a side wall flashing 47 is provided at the top of building side wall 11 immediately above an interior eave strut 48. A closure strip 49 is placed between strut 48 and sheet 34 and another closure strip 50 is placed at the top of sheets 33 and 34. Caulking material 51 is placed at the bottoms of sheets 33 and 34 and another closure strip 52 is placed between the interior galvanized sheet 35 and an adjacent girt 53. Another girt 54 above the girt 53 forms with the bottom of eave strut 48 and an adjacent angle 55 a header duct 56 across the interior of the solar panel 32 in communication with the top of the plenum 46, the interior sheet 35 being cut away at 57 to provide such communication. A duct 58 leading to interior building space includes a flange 59 attached to the back wall of header duct 56.

Similarly, a floor duct 60 having a return air screen 61 communicates with the lower end of plenum 46, the sheet 35 being cut away at 62 to provide this communication. The girt 53 may define the top wall of the duct 60. Both the header duct 56 and floor duct 60, as well as the interior wall surface of the inner corrugated sheet 35, are covered by a heavy layer of thermal insulation 63 as indicated in phantom lines in FIG. 3.

Figure 2:
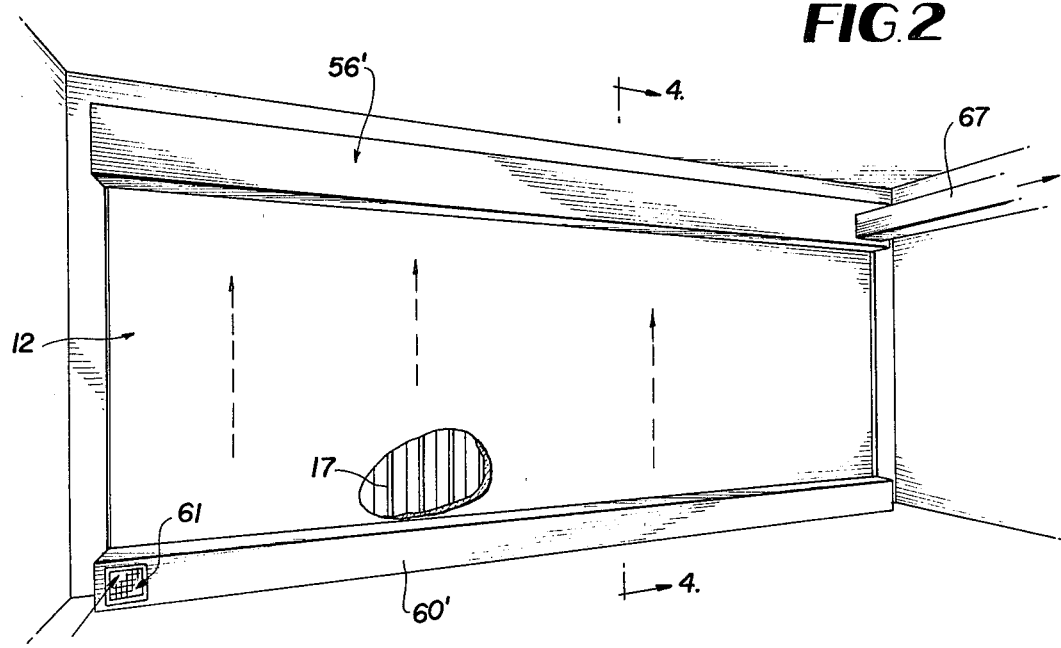
FIG. 2 is a fragmentary interior perspective view of the solar heating building end wall shown in FIG. 1.

FIG. 4 shows the comparable arrangement in cross section at the top of the building end wall solar panel 12 composed of sheets 15, 16 and 17, as described. A flashing 64 immediately below gable panel 14 overlies a closure strip 65 for the top of the open space between sheets 15 and 16. An eave line girt channel 66 inwardly of flashing 64 and gable panel 14 forms the top wall of a header duct 56' corresponding in function to the header duct 56 and receiving solar heated air from the top of plenum 31. A duct 67 leads from the header 56' to any desired building interior space. The associated floor duct at the bottom of the plenum 31 has been omitted in FIG. 4 but is essentially of the construction shown at 60 in FIG. 3. The floor duct 60' for the end wall solar panel having an inlet screen 61' is depicted in FIG. 2. The directional arrows in FIGS. 2, 3 and 4 show the warm air flow path through the solar plenum which may be induced by natural convection or blower-assisted, if desired.

It should now be apparent to those skilled in the art that the invention achieves several very important objectives by simple and economical means. It is made possible in a metal buliding to include, as a complete building wall or a large part thereof, an efficient solar heating panel which is substantially flush with the adjacent standard wall panel or sheeting to preserve the normal appearance of the building. There are no awkward or unsightly projections along or at the ends of the solar heating panel and the vital spacing and component interconnecting clips and most of the associated screws are concealed within the solar panel. The corrugations provided in the sheets making up the solar panel are configured to match exactly with the corrugations of the standard wall sections of the building.

A very unique assembly mode is embodied in the solar heating panel by virtue of the internal clip arrangement. Concealed screws secure the interior galvanized sheet of the solar panel directly to a structural member of the building. Additional screws secure together the interfitting corrugations of adjacent sections of inner galvanized sheeting and also secure the interior clip corrugations to the galvanized sheet corrugations, thus anchoring the interior clips to the interior galvanized sheeting at each corrugation. Further screws secure the flat bodies of the interior clips to the intermediate black sheeting whose corrugations are attached by further screws which also anchor the corrugations of the outermost clips to the intermediate black sheeting. Finally, additional screws secure the flat bodies of the outer clips to the exterior translucent sheets of the panel on opposite sides of the corrugations thereof. In this manner, a minimal number of clips and screws strongly tie together all components of the panel and tie the assembled panel to building wall structure while the clips simultaneously function to maintain the required spacing between the three corrugated sheets which make up the solar heating panel or collector.

In addition to the above, by a very simplified and compact arrangement, the invention realizes the continuous circulation of solar heated air through the solar panel plenum by natural convection or with forced draft means as found desirable. Simple concealed closure strips maintain the chamber integrity of the solar heating panel at all critical points to enhance the efficiency of the panel.

It is to be understood that the form of the invention herewith shown and described is to be taken as a preferred example of the same, and that various changes in the shape, size and arrangement of parts may be restored to, without departing from the spirit of the invention or scope of the subjoined claims.

We claim:

1. In a corrugated metal building wall having a structural corrugated metal panel including recurring laterally spaced parallel corrugations extending from top to bottom thereof in a regular pattern, and including horizontal girt means to which the structural corrugated metal panel is attached for support, an integrated solar heating panel section in said building wall comprising an intermediate solar heat absorbing sheet, an interior structural sheet, and an exterior solar energy transmitting sheet, all of said sheets being in spaced superposed parallel relationship and each sheet having spaced recurring corrugations extending from top to bottom thereof in the same pattern as the corrugations of said structural corrugated metal panel, girt means for the support of the solar panel heating section attached to the interior sheet thereof, the intermediate sheet forming effectively an uninterrupted continuation of said structural corrugated metal panel and the intermediate sheet and structural corrugated metal panel having overlapping and interfitting end corrugations, fastener means attaching said end corrugations in interfitting relationship, the exterior sheet of the integrated solar heating panel section being spaced forwardly of the structural corrugated metal panel and having an end corrugation adjacent to said interfitting corrugations, and a transition flashing extending from top to bottom of said building wall at the vertical juncture of the structural corrugated metal panel with said solar heating panel section, the transition flashing being attached to the structural corrugated metal panel near said juncture and including a forward wall which overlaps said end corrugation of the exterior sheet and being attached to such end corrugation, the transition flashing serving to cover and conceal said juncture, and continuous top to bottom closure strips disposed between said end corrugation of the exterior sheet and said interfitting corrugations and between the interfitting corrugations and an adjacent end corrugation of said interior structural sheet of the solar panel heating section, said interior structural sheet being spaced inwardly of the structural corrugated metal panel at said juncture.

2. In a corrugated metal building wall as defined in claim 1, and said transition flashing including a wall substantially at right angles to its forward wall and projecting inwardly from its forward wall toward the structural corrugated metal panel and terminating in an interior flange attached to such panel, the forward wall of the transition flashing having an angled terminal portion overlapping one angled wall of the end corrugation of said exterior sheet.

3. In a corrugated metal building wall as defined in claim 1, and said exterior, intermediate and interior sheets of the solar heating panel section having recurring joints therein across the width thereof formed by overlapping and interfitting corrugated terminals of said sheets, and matingly corrugated connecting and stand-off spacer clips for said sheets disposed between the intermediate and interior sheet and the intermediate and exterior sheet and being attached to the intermediate and exterior sheets on opposite sides of the clips, and the corrugations of the clips being attached to the corrugated terminals of said sheets.

* * * * *